United States Patent
Huang

(10) Patent No.: US 8,740,387 B2
(45) Date of Patent: Jun. 3, 2014

(54) AUTOSTEREOSCOPIC DISPLAY APPARATUS

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 233 days.

(21) Appl. No.: 13/452,941

(22) Filed: Apr. 23, 2012

(65) Prior Publication Data

US 2013/0155377 A1 Jun. 20, 2013

(30) Foreign Application Priority Data

Dec. 15, 2011 (TW) .............................. 100146398 A

(51) Int. Cl.
*G03B 21/00* (2006.01)
*G03B 21/14* (2006.01)
*G02B 27/22* (2006.01)
*G03B 21/60* (2014.01)
*G02B 27/10* (2006.01)

(52) U.S. Cl.
USPC ................. 353/7; 353/38; 359/473; 359/458; 359/623

(58) Field of Classification Search
CPC .......... H04N 13/0454; H04N 13/0452; H04N 13/0456; H04N 13/0285; H04N 13/0289; H04N 13/0415; H04N 13/0413; H04N 13/0409; H04N 13/045; H04N 13/0402; H04N 13/0404; G02B 27/2214; G03B 35/16; G03B 35/18

USPC .......... 353/7, 38, 32; 359/466, 473, 599, 622, 359/623, 624, 458; 348/59
See application file for complete search history.

(56) References Cited

U.S. PATENT DOCUMENTS

| | | | |
|---|---|---|---|
| 7,699,472 B2 * | 4/2010 | Shestak | 353/7 |
| 8,189,039 B2 * | 5/2012 | Hiddink et al. | 348/59 |
| 8,436,953 B2 * | 5/2013 | Sakamoto et al. | 349/15 |
| 2006/0152812 A1 * | 7/2006 | Woodgate et al. | 359/619 |
| 2012/0062559 A1 * | 3/2012 | Yun et al. | 345/419 |

FOREIGN PATENT DOCUMENTS

| | | |
|---|---|---|
| CN | 1487331 A | 4/2004 |
| TW | 201142464 A1 | 12/2011 |

* cited by examiner

*Primary Examiner* — William C Dowling
*Assistant Examiner* — Ryan Howard
(74) *Attorney, Agent, or Firm* — CKC & Partners Co., Ltd.

(57) ABSTRACT

An autostereoscopic display apparatus is provided and includes a first lenticular lens array, a second lenticular lens array, an optical diffuser layer, an image projector module and a switch unit. The optical diffuser layer is disposed between the first lenticular lens array and the second lenticular lens array. Multiple image beams generated by the image projector module are projected to a plurality of observing regions on an observing plane through the first lenticular lens array, the optical diffuser layer and the second lenticular lens array. The switch unit rotates the second lenticular lens array in accordance with the autostereoscopic display apparatus operates situated at a three-dimensional (3D) display mode or a two-dimensional (2D) display mode.

10 Claims, 4 Drawing Sheets

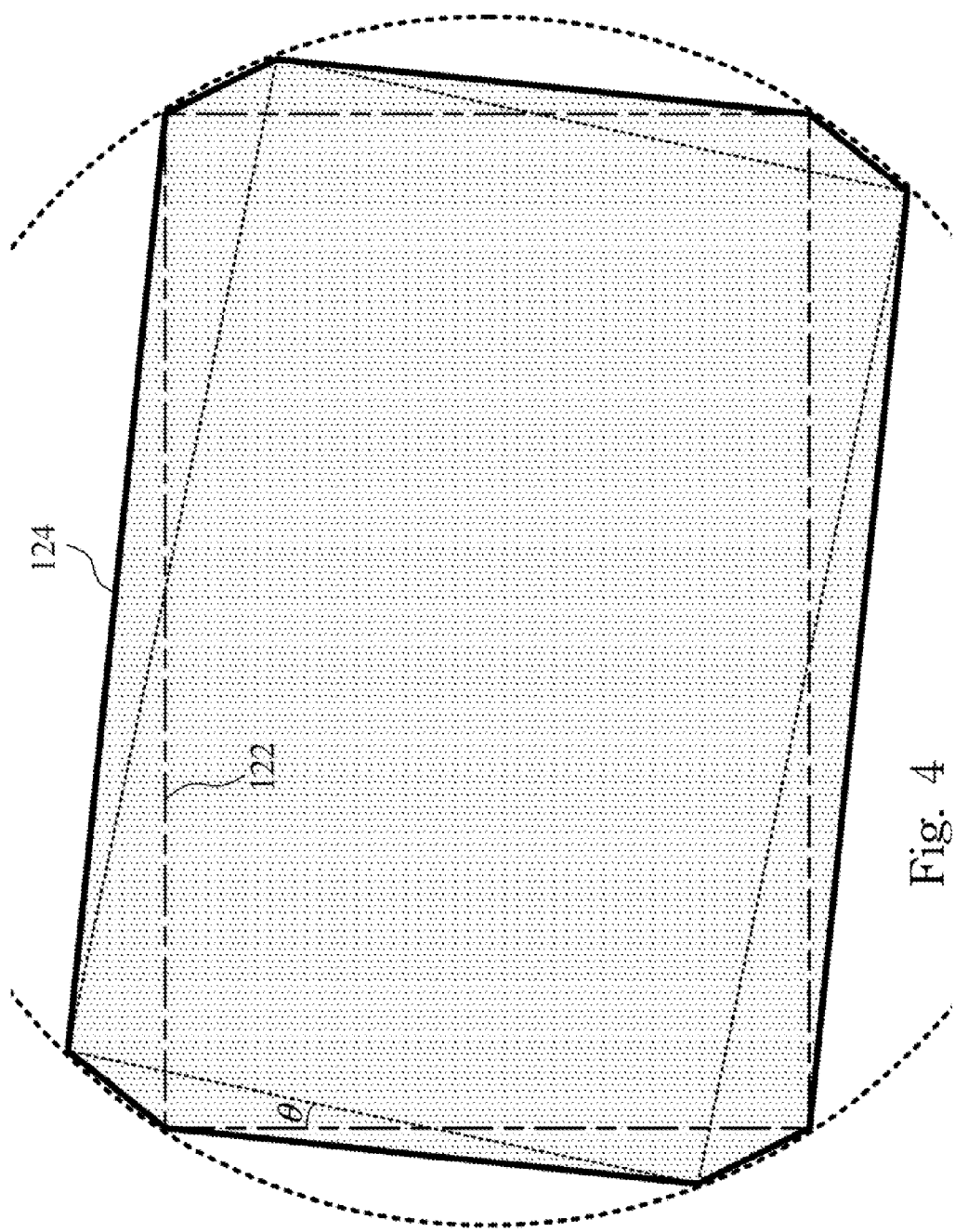

AUTOSTEREOSCOPIC DISPLAY APPARATUS

RELATED APPLICATIONS

This application claims priority to Taiwan Application Serial Number 100146398, filed Dec. 15, 2011, which is herein incorporated by reference.

FIELD OF THE INVENTION

This invention relates to a display device, and more particularly, to an autostereoscopic display apparatus.

BACKGROUND OF THE INVENTION

In recent years, technical barriers of three-dimensional (3D) display technology have been gradually broken through, and applications such as 3D movies and 3D televisions start to be presented to the market. The 3D effect brought by a 3D display is actually resulted from simultaneously presenting a left-eye image and a right-eye image corresponding to different viewing angles to an observer's eyes individually and independently, wherein depth of field resulted from a distance between two eyes when viewing the 3D display can be simulated by using the left-eye image and the right-eye image.

Autostereoscopic display technology is a newly developed technology for 3D display. Through the autostereoscopic display technology, a 3D image effect can be directly observed by naked eyes without wearing special 3D glasses. Conventional autostereoscopic display technology can be classified into three types in accordance with the methods used for generating multiple views. One type is time-multiplexing achieved by sequentially turning on a plurality of light sources. Another type is spatial-multiplexing achieved by dividing a pixel into a plurality of separate blocks for different multiple viewing angles. Further, another type is a multi-projector achieved by using a plurality of light modulators.

Wherein, the spatial-multiplexing is to insert at least two images of different viewing angles among pixels, such that each specific observing region can only view an image of a corresponding viewing angle.

In other words, the spatial-multiplexing achieves an autostereoscopic display effect of multiple viewing angles with sacrificing image resolution. The more the corresponding viewing angles are, the severer the resolution decrease is. When the 3D display is used to display a common two-dimension (2D) image, the resolution of the 2D image is also sacrificed. Therefore, those who are in this filed provide an autostereoscopic display technology with switchable 3D/2D display modes, and contemplate how to avoiding sacrificing resolution when the 3D display mode is switched to the 2D display mode.

In a conventional 3D/2D switchable display device, a mechanical method is mainly used to remove a lenticular lens film necessary in a 3D image formation process, so as to switch the display device from the 3D display mode to the 2D display mode. The conventional lenticular lens film is usually attached on a display panel and has a fragile structure, such that the conventional lenticular lens film is easily subject to damages caused by the aforementioned mechanically switching method.

U.S. Pat. No. 5,500,765 provides a 3D/2D switchable display device having a removable flip cover, and a complementary lens structure for the lenticular lens is disposed on the removable flip cover, so that a user can move the removable flip cover in a mechanical or manual manner to switch 3D/2D display modes. However, the removable flip cover and the lenticular lens have to be exposed to environment, and are subject to damages caused by hit, shock, and variation of temperature.

Another conventional 3D/2D switchable display device is enabled by using an electro-optical media material with an electronic switching method. For example, in U.S. Pat. No. 5,500,765, an electro-optical media material is filled between the lenticular lens and a planar lens, and different operation voltages are applied on an electrode of the electro-optical media material to vary an alignment direction of molecules of the electro-optical media material for switching the 3D/2D display modes. However, how to fill the electro-optical media material between the lenticular lens and the planar lens in a display panel having a great area; and the switching stability and efficiency of the electro-optical media material are still a quest to be solved.

The conventional mechanical switching method needs to greatly shift the position of the lenticular lens, and thus the lenticular lens is easily subject to damages. The electronic switching method has the problems of manufacturing difficulties, switching stability and switching efficiency.

SUMMARY OF THE INVENTION

In order to solve the above problems, this disclosed document proposes an autostereoscopic display apparatus that can switch between a 3D display mode and a 2D display mode. The autostereoscopic display apparatus comprises two lenticular lens arrays to form a dual convex lenticular lens array. Under the 3D display mode, the two lenticular lens arrays are substantially parallel to each other, and under the 2D display mode, the second lenticular lens array is rotated by a specific deflection angle. In this disclosed document, the autostereoscopic display apparatus can be switched between the 3D/2D display modes merely through a small rotation of the lenticular lens arrays, and also can be recovered to the resolution under the 2D display mode.

An aspect of this closure is to provide an autostereoscopic display apparatus including a first lenticular lens array, a second lenticular lens array, an optical diffuser layer, an image projector module, and a switch unit. The optical diffuser layer is disposed between the first lenticular lens array and the second lenticular lens array. A plurality of image beams generated by the image projector module are projected to a plurality of observing regions through the first lenticular lens array, the optical diffuser layer, and the second lenticular lens array. The switch unit rotates the second lenticular lens array in accordance with the autostereoscopic display apparatus situated at a three-dimensional (3D) display mode or a two-dimensional (2D) display mode.

According to an embodiment of this disclosure, the first lenticular lens array and the second lenticular lens array are substantially parallel to each other under the 3D display mode.

According to an embodiment of this disclosure, the switch unit rotates the second lenticular lens array by a deflection angle in the 2D display mode.

According to an embodiment of this disclosure, the optical diffuser layer includes a plurality of pixel regions, and each of the pixel regions includes a light-source mapping block, and an area occupied by the light-source mapping block in each of the pixel regions is 1/N of an area of each of the pixel regions.

According to an embodiment of this disclosure, the light-source mapping block and each of the pixel regions have the same height, and a width of the light-source mapping block is 1/N of a width of each of the pixel regions.

According to an embodiment of this disclosure, $$\theta = \tan^{-1}\frac{2}{N},$$

where θ is the deflection angle.

According to an embodiment of this disclosure, after the switch unit has rotated the second lenticular lens array by the deflection angle under the second two-dimension display mode, image beams passing through lenticular lenses in odd numbers of columns of the first lenticular lens array, and image beams passing through lenticular lenses in even numbers of columns of the first lenticular lens array uniformly form images on a right side and a left side of the observing plane.

According to an embodiment of this disclosure, in the second 2D display mode, image beams passing through lenticular lenses in odd numbers of columns of the first lenticular lens array form an image on a side of the observing plane, and image beams passing through lenticular lenses in even numbers of columns of the first lenticular lens array uniformly form an image on another side of the observing plane.

According to an embodiment of this disclosure, the second lenticular lens array is in a form of an octagon, and the second lenticular lens array is greater than the first lenticular lens array in area.

According to an embodiment of this disclosure, the image projector module includes a spatial light modulator (SLM) and a plurality of light sources, and the light sources are sequentially turned on in cycles.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is a diagram showing the relative relationship between the first lenticular lens array and the second lenticular lens array shown in FIG. 1.

DETAILED DESCRIPTION OF THE PREFERRED EMBODIMENT

Figure 1:
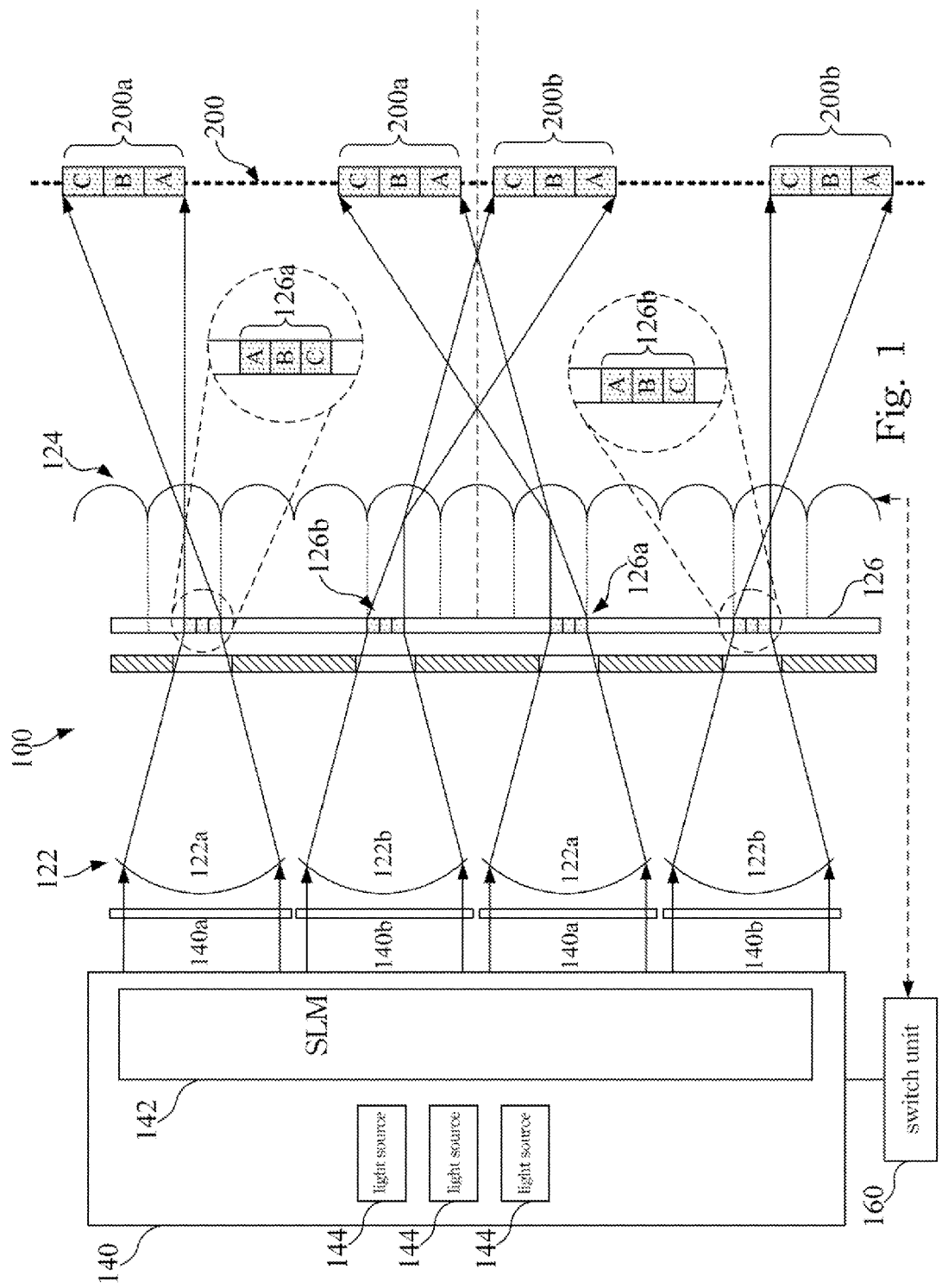
FIG. 1 is a diagram showing an autostereoscopic display apparatus in accordance with an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts. However, the embodiments do not intend to limit the scope encompassed by the present invention, and descriptions about operation of optical structures do not intend to limit the relationship between the optical structures. Any structure recombined by elements and devices having equivalent functions are encompassed by the present invention. In another aspect, elements and processes well known are not described in the embodiments to avoid unnecessary limitations to the present invention.

Referring to FIG. 1, FIG. 1 is a diagram showing an autostereoscopic display apparatus 100 in accordance with an embodiment of the present invention. The autostereoscopic display apparatus 100 includes a first lenticular lens array 122, a second lenticular lens array 124, an optical diffuser layer 126, an image projector module 140, and a switch unit 160. The optical diffuser layer 126 is disposed between the first lenticular lens array 1222 and the second lenticular lens array 124. A plurality of image beams generated by the image projector module 140 are projected to a plurality of specific positions through the first lenticular lens array 122, the optical diffuser layer 126, and the second lenticular lens array 124. In this embodiment, the specific positions are observing regions 200a and 200b on an observing plane 200 observable to an observer.

As shown in FIG. 1, pixels of each of columns of the image beams generated by the image projector module 140 are respectively corresponding to lenticular lenses (such as 122a, 122b) in a column of the first lenticular lens array 122, wherein image beams 140a generated by the image projector module 140 and belong to pixels in odd numbers of columns are corresponding to lenticular lenses 122a in odd numbers of columns of the first lenticular lens array 122, and in another aspect, image beams 140b which are generated by the image projector module 140 and belong to pixels in even numbers of columns are corresponding to lenticular lenses 122b in even numbers of columns of the first lenticular lens array 122.

In this embodiment, the image beams 140a and 140b generated by the image projector module 140 pass through the first lenticular lens array 122 and respectively form light-source mapping blocks 126a and 126b.

Figure 2:
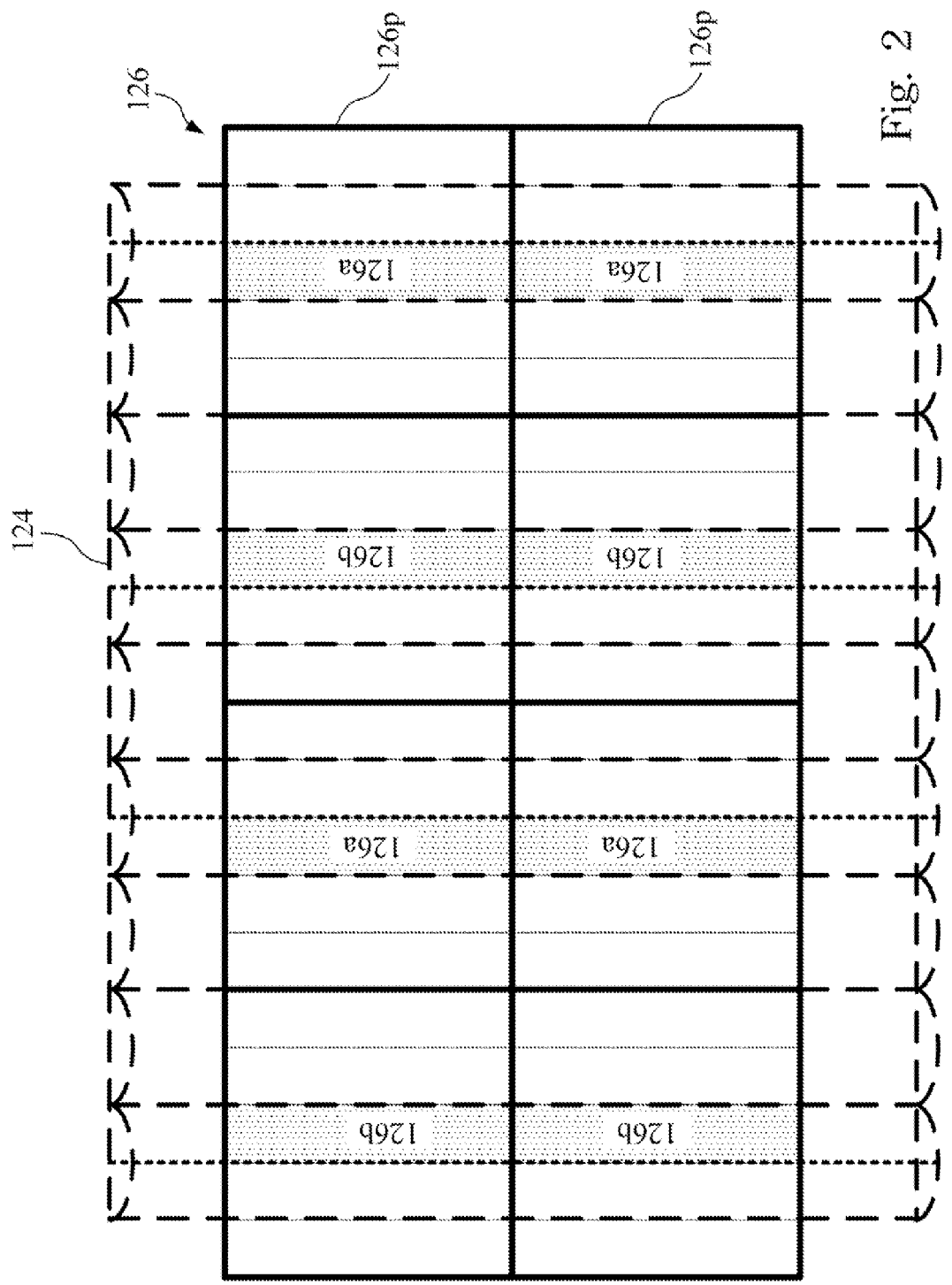
FIG. 2 is a diagram showing the second lenticular lens array and the optical diffuser layer of the FIG. 1 under a 3D display mode.

Referring to FIG. 2, FIG. 2 is a diagram showing the second lenticular lens array 124 and the optical diffuser layer 126 of the FIG. 1 under a 3D display mode. The optical diffuser layer 126 includes a plurality of pixel regions 126p. As shown in FIG. 2, the optical diffuser layer 126 includes eight pixel regions 126p, and a size of each of the pixel regions 126p corresponds to a size of a pixel of an image projected by the projector module 140.

Each of the image beams 140a and 140b of pixel columns passes through each of the lenticular lenses of the first lenticular lens array 122, and respectively form images as light-source mapping blocks 126a and 126b on the optical diffuser layer 126. Each of the light-source mapping blocks 126a and 126b occupies an area having a fixed proportion in the pixel region 126p. In this embodiment, in each of the pixel regions 126p, a ratio of an area occupied by each of the light-source mapping blocks 126a and 126b to an area of the region 126p is 1/5, and the ratio can be varied in accordance with strength of the lenticular lenses of the first lenticular lens array 122. The present invention is not limited to the ratio of 1/5.

It is noted that the relative relationship between the second lenticular lens array 124 and the optical diffuser layer 126 under the 3D display mode is shown in FIG. 2. As shown in FIG. 1 and FIG. 2, under the 3D display mode of this embodiment, each of the light-source mapping blocks (126a or 126b) is corresponding to one side (one single half portion, such as a left-half portion and a right-half portion) of each of the lenticular lenses of the second lenticular lens array 124, such that the image beams are projected towards the side of the second lenticular lens array 124 through each lenticular lens.

For example, as shown in FIG. 1 and FIG. 2, the light-source mapping blocks 126a are corresponding to left-half portions of the second lenticular lens array 124. Accordingly, image beams 140a of the light-source mapping blocks 126a are projected to an opposite side of the second lenticular lens array 124 through the lenticular lenses of the second lenticular lens array 124. For example, the image beams 140a of the light-source mapping blocks 126a are projected on right-half portions of observing regions 200a of the observing plane 200.

In the schematic diagram shown in FIG. 1, one single light-source mapping block 126a is corresponding to one column of lenticular lenses of the second lenticular lens array 124, and is projected on one observing region 200a. However, in practice, one single light-source mapping block 126a is not merely projected on one observing region 200a, and the one single light-source mapping block 126a also corresponding to other columns of lenticular lenses is also projected on multiple repeated observing regions of different positions on the observing region 200. For simplicity, the repeated observing regions are not shown in FIG. 1.

On the other hand, one single light-source mapping block 126b is corresponding to right-half portions of the second lenticular lens array 124. Accordingly, image beams 140b of the light-source mapping blocks 126b are projected to an opposite side of the second lenticular lens array 124 through the lenticular lenses of the second lenticular lens array 124. For example, the image beams 140b of the light-source mapping blocks 126b are projected on left-half portions of observing regions 200b of the observing plane 200.

Similarly, the one single light-source mapping block 126b is also corresponding to other columns of lenticular lenses, such that the light-source mapping block 126b is projected on multiple repeated observing regions of different positions on the observing region 200. For simplicity, the repeated observing regions repeatedly generated by the light-source mapping block 126b are not shown in FIG. 1.

Therefore, under the 3D display mode, the image beams of odd numbers of columns and the image beams of even numbers of columns are respectively projected onto the left side and the right side of the observing plane 200 so as to achieve a wider viewing angle and to produce twice observing regions.

In addition, each of observing regions 200a and 200b does not only include one single viewing angle region. In this embodiment, the autostereoscopic display apparatus 100 in the embodiment of FIG. 1 has time-multiplexing and spatial-multiplexing schemes.

The image projector module 140 of the autostereoscopic display apparatus 100 includes a spatial light modulator (SLM) 142 and three light sources 144, wherein the three light sources 144 are sequentially turned on in cycles, thereby forming three viewing-angle regions in each of the light-source mapping blocks 126a and 126b of the optical diffuser layer 126. As shown in FIG. 1, the there viewing-angle regions in each of the light-source mapping blocks 126a and 126b are labeled with reference numbers A, B, and C respectively. Therefore, the viewing-angle regions A, B, and C are formed in each of the light-source mapping blocks by using the time-multiplexing mechanism. Thereafter, the there viewing-angle regions A, B, and C of each of the light-source mapping blocks 126a and 126b are used to correspondingly form there viewing-angle regions A, B, and C in each of the observing planes 200a and 200b. Therefore, a total number of the viewing-angle regions is increased by three times.

In practice, the number of the light sources 144 is not limited to three. In another embodiment, the image projector module 140 may include more light sources to form more viewing-angle regions.

In addition, the way to form the there viewing-angle regions A, B, and C in each of the light-source mapping blocks is not limited to sequentially turning on the light sources. In another embodiment, it can be achieved by using a multi-projector to produce a plurality of viewing-angle regions. For example, three projectors are used to produce three viewing-angle regions corresponding to each of the pixels at the same time.

However, as shown in FIG. 1 and FIG. 2, under the above architecture, when a user observes from the observing regions 200a on the right side of the observing region 200, the user merely sees the light-source mapping blocks 126a generated by the image beams 140a of odd numbers of column pixels. When the user observes from the observing regions 200b on the left side of the observing region 200, the user merely sees the light-source mapping blocks 126b generated by the image beams 140b of even numbers of column pixels. Therefore, a resolution of an image observable to the user is equal to only one half of the original resolution of the image.

Generally speaking, a display device under the 2D display mode does not need the aforementioned visual-fields separation function. If the aforementioned optical projection method is applied under the 2D display mode, the display device merely has a resolution up to one half of the original resolution. In the present invention, when the autostereoscopic display apparatus 100 is switched to the 2D display mode, the resolution of the images observable to the user can be recovered to the original resolution.

Figure 3:
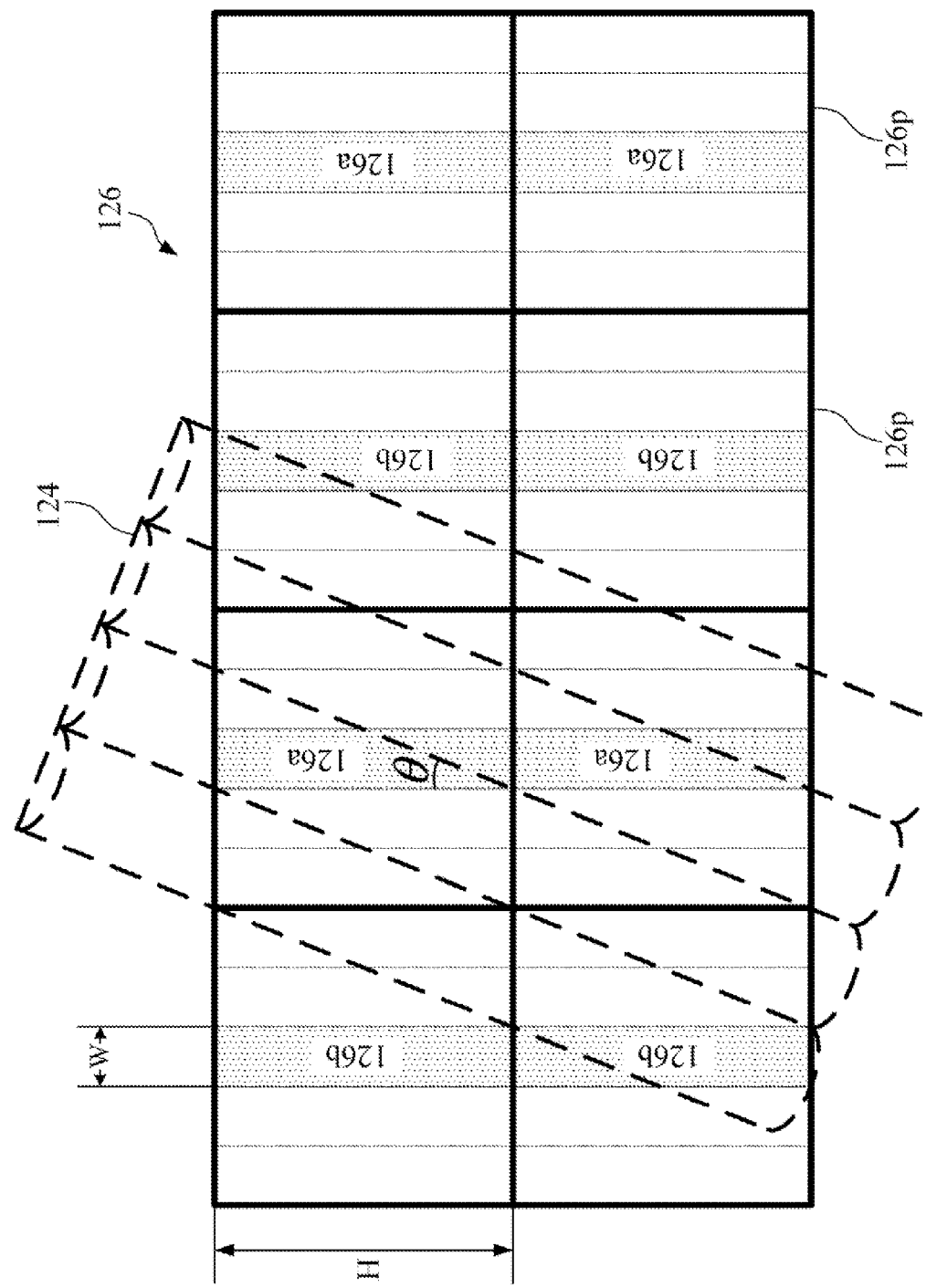
FIG. 3 is a diagram showing the relative relationship between the second lenticular lens array and the optical diffuser layer of FIG. 1 under a 2D display mode.

Referring to FIG. 1, FIG. 2, FIG. 3 and FIG. 4 simultaneously, the switch unit 160 shown in FIG. 1 rotates the second lenticular lens array 124 relative to the optical diffuser layer 126 in accordance with the mode in which the autostereoscopic display apparatus 100 operates, wherein the mode is the 2D display mode of the 3D display mode. FIG. 2 is a diagram showing the relative relationship between the second lenticular lens array 124 and the optical diffuser layer 126 under the 3D display mode. After the second lenticular lens array 124 has been rotated, the display mode is switched to the 2D display mode. FIG. 3 is a diagram showing the relative relationship between the second lenticular lens array 124 and the optical diffuser layer 126 of FIG. 1 in the 2D display mode.

As shown in FIG. 2, under the 3D display mode, the first lenticular lens array 122 and the second lenticular lens array 124 are parallel to each other. At this time, pixels of odd numbers of columns and pixels of even numbers of columns are respectively projected on the left side and the right side of the observing plane, and an effect of horizon separation occurs.

As shown in FIG. 3, when the autostereoscopic display apparatus 100 is switched to the 2D display mode, the switch unit 160 of the present invention rotates the second lenticular lens array 124 by a deflection angle θ. After the second lenticular lens array 124 has been rotated, the resolution corresponding to the 2D display mode is recovered to the original resolution. In the following descriptions, how to recover the resolution with the rotation of the second lenticular lens array 124 is further explained.

As shown in FIG. 3, under the 2D display mode, the switch unit 160 rotates the second lenticular lens array 124 to enable the light-source mapping block 126b in each of the pixel regions 126p to be corresponding to a right side of each of the lenticular lenses of the second lenticular lens array 124 (projected on the left side of the observing plane 200) and a left side of each of the lenticular lenses of the second lenticular lens array 124 (projected on the right side of the observing plane 200) simultaneously, thus a complete image instead of a half portion of an image (such as pixels of odd numbers of columns or pixels of even numbers of columns) can be observed from the left side and the right side of each of the observing plane 200.

In order to enable the light-source mapping blocks 126a and 126b to be uniformly corresponding to the right sides and the left sides of the lenticular lenses of the second lenticular lens array 124, thereby, under the 2D display mode, enabling the image beams from pixels of odd numbers of columns and pixels of even numbers of columns to be uniformly observed for each of the viewing angles, a formula presenting the value of the deflection angle θ is shown below:

$$\theta = \tan^{-1}\frac{W}{1/2*H},$$

wherein W is a width of the light-source mapping block, and H is a height of the light-source mapping block, as shown in FIG. 3.

In this example, it is assumed that the width and height of each of the pixel regions 126p are the same. In this embodiment, the light-source mapping block 126a or 126b has a height equal to that of each of the pixel regions 126p, and the light-source mapping block 126b has a width equal to 1/N of a width of each of the pixel regions 126p. A value of the deflection angle θ can be derived:

$$\theta = \tan^{-1}\frac{2}{N},$$

wherein 1/N is a proportion of an area occupied by the light-source mapping block 126a or 126b to an area of each of the pixel regions 126p (in this case, the proportion is a width proportion).

In this embodiment, the proportion of an area occupied by the light-source mapping block 126a or 126b to the area of each of the pixel regions 126p is 1/5 (this proportion can be varied in accordance with the strength of the first lenticular lens array 122. Therefore, in this embodiment, under the 2D display mode, the deflection angle θ by which the switch unit 160 rotates the second lenticular lens array 124 is equal to $$\tan^{-1}\frac{2}{5}.$$

It means that the deflection angle θ is substantially equal to 21.8 degrees, but the present invention is not limited thereto.

In addition, in order to enable the second lenticular lens array 124 to completely cover the full first lenticular lens array 122 after or before the rotation to avoid that edge portions of the first lenticular lens array 122 cannot be covered because of the rotation, the second lenticular lens array 124 can be designed in a special shape. Referring to FIG. 4, FIG. 4 is a diagram showing the relative relationship between the first lenticular lens array 122 and the second lenticular lens array 124 shown in FIG. 1. A shape of the second lenticular lens array 124 is an octagon, and the second lenticular lens array 124 is greater than the first lenticular lens array 122 in area, thereby enabling the second lenticular lens array 124 to completely cover the full first lenticular lens array 122 after or before the rotation.

In other words, the switch unit 160 of the autostereoscopic display apparatus 100 of the present invention just needs to rotate the second lenticular lens array 124 with small degrees, thus the resolution of the autostereoscopic display apparatus 100 under the 2D display mode is recovered to the original resolution. It is not necessary to fill special electro-optical media material in processes for switching 3D/2D resolution. Therefore, the 3D/2D resolution switching method of the present invention is easy to be implemented, and has high stability.

In sum of all, the autostereoscopic display apparatus proposed by this disclosed document can switch between the 3D display mode and the 2D display mode. The autostereoscopic display apparatus comprises two lenticular lens arrays to form a dual convex lenticular lens array. Under the 3D display mode, the two lenticular lens arrays are substantially parallel to each other, and under the 2D display mode, the second lenticular lens array is rotated by a specific deflection angle. In this disclosed document, the autostereoscopic display apparatus can be switched between the 3D/2D display modes merely through a small rotation of the lenticular lens arrays, and also can be recovered to the resolution under the 2D display mode.

As is understood by a person skilled in the art, the foregoing embodiments of the present invention are strengths of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. An autostereoscopic display apparatus, comprising:

a first lenticular lens array;

a second lenticular lens array;

an optical diffuser layer disposed between the first lenticular lens array and the second lenticular lens array;

an image projector module, wherein a plurality of image beams generated by the image projector module are projected on a plurality of observing regions on an observing plane through the first lenticular lens array, the optical diffuser layer, and the second lenticular lens array; and a switch unit for rotating the second lenticular lens array in accordance with the autostereoscopic display apparatus situated at a three-dimensional (3D) display mode or a two-dimensional (2D) display mode.

2. The autostereoscopic display apparatus of claim 1, wherein the first lenticular lens array and the second lenticular lens array are substantially parallel to each other under the 3D display mode.

3. The autostereoscopic display apparatus of claim 1, wherein the switch unit rotates the second lenticular lens array by a deflection angle in the 2D display mode.

4. The autostereoscopic display apparatus of claim 3, wherein the optical diffuser layer comprises a plurality of pixel regions, and each of the pixel regions comprises a light-source mapping block, and an area occupied by the light-source mapping block in each of the pixel regions is 1/N of an area of each of the pixel regions.

5. The autostereoscopic display apparatus of claim 4, wherein the light-source mapping block and each of the pixel regions have the same height, and a width of the light-source mapping block is 1/N of a width of each of the pixel regions.

6. The autostereoscopic display apparatus of claim 4, wherein $$\theta = \tan^{-1}\frac{2}{N},$$

where θ is the deflection angle.

7. The autostereoscopic display apparatus of claim 3, wherein, after the switch unit has rotated the second lenticular lens array by the deflection angle under the second two-dimension display mode, image beams passing through lenticular lenses in odd numbers of columns of the first lenticular lens array, and image beams passing through lenticular lenses in even numbers of columns of the first lenticular lens array uniformly form images on a right side and a left side of the observing plane.

8. The autostereoscopic display apparatus of claim 1, wherein under the 2D display mode, image beams passing through lenticular lenses in odd numbers of columns of the first lenticular lens array form an image on a side of the observing plane, and image beams passing through lenticular lenses in even numbers of columns of the first lenticular lens array uniformly form an image on another side of the observing plane.

9. The autostereoscopic display apparatus of claim 1, wherein the second lenticular lens array is in a form of an octagon, and the second lenticular lens array is greater than the first lenticular lens array in area.

10. The autostereoscopic display apparatus of claim 1, wherein the image projector module comprises a spatial light modulator (SLM) and a plurality of light sources, and the light sources are sequentially turned on in cycles.

* * * * *